Oct. 15, 1935.　　　　A. HUND　　　　2,017,658
RECTIFIER SUPPLY SYSTEM
Filed March 8, 1934
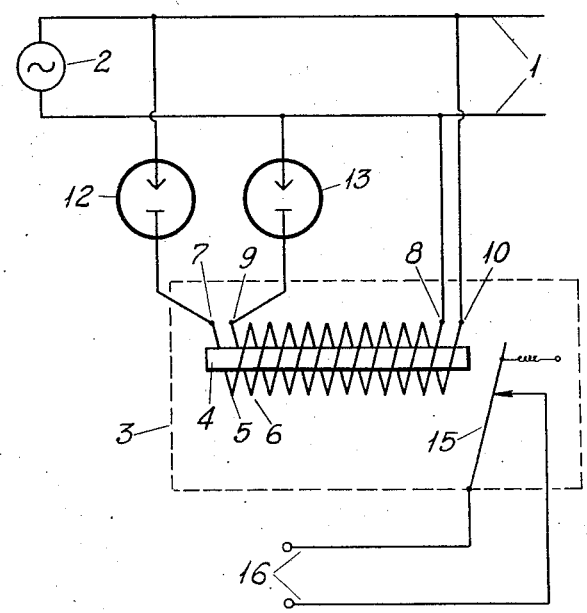
INVENTOR
August Hund
BY
Wm. J. Herdman
ATTORNEY Patented Oct. 15, 1935

2,017,658

UNITED STATES PATENT OFFICE 2,017,658

RECTIFIER SUPPLY SYSTEM

August Hund, West Orange, N. J., assignor to Wired Radio, Inc., New York, N. Y., a corporation of Delaware Application March 8, 1934, Serial No. 714,663

1 Claim. (Cl. 175—320)

My invention pertains in general to rectifier supply systems and specifically relates to an arrangement for effecting the continuous operation of an electrical utilization device through the agency of rectification means.

One of the objects of my invention consists in providing a system for supplying rectified alternating current to an electrical utilization device through different rectification circuit paths during alternate half cycles of the current supply.

Another object of my invention consists in producing a rectifier system for direct coupling with power lines to avoid the use of transformers.

Another object comprises providing a rectifier supply system for producing a continuously effective electromagnetic field of the same polarity.

A further object comprises providing an electromagnetic device having a plurality of electrical windings and separate rectifier devices connected in opposed relationship between said windings and a source of alternating current.

I accomplish these and other desirable objects in a rectifier supply system diagrammatically represented in a preferred embodiment in the accompanying drawing.

In the operation of a direct current power relay from alternating current, it is usually necessary to employ full wave rectification. Full wave rectification, however, requires a transformer for producing twice the voltage with a center tap. For example, if single wave rectification would operate from a 110 volt supply line, then full wave rectification would require twice 110 volts or a step-up transformer to produce this double voltage. The system of my invention utilizes the same voltage as would be necessary for half wave rectification, which in the example cited would be 110 volts, and thereby avoids the use of transformer coupling. My invention contemplates connecting rectifier tubes inversely to the alternating current lines and utilizing these rectifiers to separately energize magnetization windings of a relay.

Referring to the drawing in detail, power lines 1 are connected with a suitable source of alternating current 2. A relay 3 is generally indicative of a form of utilization device in which it is desired to produce a continuously effective electromagnetic field of the same polarity. It will be understood, of course, that various other types of apparatus may be employed when desired without departing from the intended scope of my invention. Referring to the drawing, the core 4 is provided with dual windings 5 and 6 which are substantially similar and coextensively interleaved. The winding 5 extends between terminals 7 and 8, while the winding 6 extends between terminals 9 and 10.

The terminal 7 is connected through a rectifier device 12 to one of the power lines 1, while the terminal 8 is connected to the opposite power line. The terminal 9 is connected through a rectifier device 13 to the power line opposite that to which the rectifier 12 is directly connected. The other terminal 10 is connected to the power line 1 opposite that to which the terminal 8 is connected. It will be seen that the rectifiers 12 and 13 are connected in opposition to the line 1 as far as instantaneous polarity of the alternating current supply is concerned.

In the operation of my system, the rectifiers 12 and 13 function serially during alternate half cycles of the alternating current supply. That is, during the first half cycle the rectifier 12 will supply rectified current to the winding 5, while during the next half cycle, the rectifier 13 will supply rectifying current to the winding 6. In this arrangement, the windings 5 and 6 are alternately effective for producing a continuous electromagnetic field of the same polarity for any useful purpose such as controlling the armature 15 which governs a control circuit from terminals 16. The rectifiers 12 and 13 may be of any preferred type, such as the rectifier disclosed in my copending application, Serial Number 714,662, filed March 8, 1934.

One of the advantages of my rectifier supply system is that the need for transformer coupling is avoided. For example, where it is desired to energize a relay or other device from an alternating current source, it has heretofore been necessary to provide a full wave rectifier in conjunction with the transformer. The system of my invention makes it possible to produce a substantially continuously effective electromagnetic field of the same polarity without transformer coupling.

Although I have shown a preferred form of my rectifier supply system, it will of course be understood that changes can be made without departing from the intended scope of my invention. I do not therefore desire to limit myself to the foregoing except insofar as may be pointed out in the appended claim.

What I claim as new and desire to secure by Letters Patent of the United States is:

A rectifier supply system comprising, in combination, a pair of conductors connected to a source of alternating current supply, a plurality of rectifier units, a plurality of coextensive interleaved electromagnetic windings, conductive connections connecting similar terminals of each of said rectifier units with corresponding terminals of each of said windings respectively, conductive connections connecting the remaining terminal of one of said rectifier units to one conductor of said pair of conductors and the remaining terminal of the winding connected with said rectifier unit with the opposite conductor of said pair of conductors, conductive connections connecting the remaining terminal of the other of said rectifier units and the remaining terminal of the other of said windings to said pair of conductors in an opposite sense with respect to the instantaneous polarity of the connections of the first-mentioned rectifier unit and winding whereby a substantially continuous electromagnetic field of the same polarity is produced by said windings.

AUGUST HUND.